United States Patent [19]

Horst et al.

[11] 4,402,792

[45] Sep. 6, 1983

[54] APPARATUS FOR PRODUCING ALCOHOL FUEL

[76] Inventors: Floyd E. Horst, R.D. 1, Box 165, Newmanstown, Pa. 17073; Robert M. Krieder, Rte. 1, Box 2180, Jonestown, Pa. 17038

[21] Appl. No.: 173,193

[22] Filed: Jul. 25, 1980

[51] Int. Cl.³ .............................................. B01D 3/24
[52] U.S. Cl. ................................... 202/159; 202/160; 202/179; 202/241; 159/DIG. 13; 203/19; 203/22; 203/DIG. 13; 251/141; 261/113; 261/148; 435/161; 435/287; 435/813; 44/53
[58] Field of Search ............... 202/158, 159, 160, 179, 202/241, 236, 198, 180; 196/100, 105, 139, 122; 261/148, 113, 114; 251/141; 122/387; 203/89, 19, DIG. 13, 22, 87, 2; 426/494; 159/DIG. 13; 435/161, 287, 813

[56] References Cited

U.S. PATENT DOCUMENTS

| | | | |
|---|---|---|---|
| 125,463 | 4/1872 | Kunze | 202/158 |
| 1,104,948 | 7/1914 | Woolner | 426/494 |
| 1,513,354 | 10/1924 | Wadsworth | 202/158 |
| 1,891,705 | 12/1932 | Delas | 159/DIG. 13 |
| 2,071,693 | 2/1937 | Hines | 202/159 |
| 2,233,066 | 2/1941 | Watson | 159/DIG. 13 |
| 2,591,672 | 4/1952 | Catterall | 203/DIG. 13 |
| 2,971,897 | 2/1961 | Chapman | 202/241 |
| 3,616,267 | 10/1977 | McNeil et al. | 202/160 |
| 4,046,351 | 9/1977 | Lang | 251/141 |
| 4,265,736 | 5/1981 | Thayer | 202/159 |

Primary Examiner—Wilbur L. Bascomb, Jr.
Attorney, Agent, or Firm—Gary, Juettner & Pyle

[57] ABSTRACT

An apparatus and method for producing alcohol fuel in an efficient and continuous manner are provided. The apparatus and method utilize otherwise lost heat to reduce the amount of heat required to convert feed stock into alcohol fuel. The apparatus and method utilize the supply of feed stock from a hopper through an auger to a cooker vessel, and then in turn to enzyme and fermenting tanks or vessels, which in turn discharge fermented mash to a strainer for separation of the alcohol beer from the mash. The beer is then discharged to a level controlled beer tank which regulates a residue valve controlling the amount of residue liquid returned to the apparatus and maintained under process. From the beer tank, the flow of the beer is regulated by passage through a non-clogging control valve into a reflux column. A single control in the form of a sensible heat detector in the reflux column operates the non-clogging control valve and simultaneously regulates both the quantity of beer supplied to the reflux column and the amount of reflux supplied thereto. The reflux column utilizes highly efficient spreader and concentrator plates therein which are supplied with reflux from the incoming beer to enhance the efficiency of the reflux column. From the reflux column, uncondensed alcohol vapors may be withdrawn and then treated with a denaturing agent before being condensed so that pottable alcohol is never formed. Additionally, heat exchangers are utilized in the apparatus and method to recapture what would otherwise be lost heat, particularly from the hot residue liquid accumulated and discharged from the reflux column, for heating the various fluids in the apparatus and under process.

3 Claims, 9 Drawing Figures

APPARATUS FOR PRODUCING ALCOHOL FUEL

This invention relates to a distillation apparatus and method for producing alcohol fuel, and in more particular, to a distillation apparatus and method which can continuously produce alcohol fuel while essentially being unattended and consuming only a small fraction of the energy as compared to the energy of the alcohol fuel produced.

Heretofore, it had been known to produce alcohol fuels from feed stock such as corn. Such prior devices and techniques have had the disadvantage in that they consumed more or nearly as much energy in making the alcohol fuel as the alcohol that was made possessed. In addition, such prior art systems had the disadvantage of requiring frequent attendance of an operator to keep the system operating. For example, in prior art separators for beer and mash, such frequently became clogged with solid particles. In addition, unless elaborate filtering techniques were used, such solid particles tended to be carried along with the beer and to clog valves in the device which were in less than a full open position. Such plugged valves could cause malfunctions of the device. Further, such prior art devices had reflux columns which had separate controls for the amount of reflux provided to the column and for the amount of beer admitted to the column to be distilled. Such separate controls for beer and reflux added to the complexity. The efficiencies of such prior reflux column, while, perhaps, satisfactory when run at full capacity, was lower at a reduced capacity, so that in a continuously operating system which has to operate at full capacity and also less than full capacity, perhaps for a greater period of time, such prior art reflux column was unsatisfactory. Further, in various portions of the prior art devices, such as the cooker and the boiler for the reflux column, there was a tendency for matter to cake or build up and reduce or inhibit heat transfer in the device. Such build ups and reduction in heat transfer greatly reduced the efficiency of such portions of the prior art device. Further, in prior art devices, before the denaturing occurred, pottable alcohol was formed so that the government regulations pertaining to both the distillation process and pottable alcohol had to be complied with.

SUMMARY OF THE INVENTION

The apparatus and method of the present invention has overcome the foregoing disadvantages. The apparatus comprises a storage hopper which includes and may be discharged by an auger, which in turn feeds a cooker vessel in series with an enzyme tank or vessel and one or more fermenting tanks or vessels. The discharge from the fermenting tank is then separated into mash and beer, and the beer is fed to a level control tank and then as needed, fed through a non-clogging control valve to a distillation or reflux column. The beer coming into the reflux column also provides the reflux cooling. After distillation, the uncondensed alcohol coming off the reflux column may be automatically injected with a denaturing agent while still a vapor so that pottable alcohol is never formed. The denatured alcohol vapors are condensed and then collected in a storage tank for further use. The apparatus of the present invention utilizes scraper means in various portions thereof to keep heat transfer surfaces clean to enhance the efficiency of the apparatus and method. In addition, hot residue liquid discharged from the reflux column may be collected and used to provide heat to the cooker vessel and also incoming liquids being added to the feed stock. Also, in addition to heating the incoming liquids, the residue is returned as needed back into the enzyme tank to maintain the proper quantity of liquid within the apparatus and under process.

The reflux column of the apparatus of the present invention comprises a plurality of specially formed spreader and concentrator plates which promote the transfer of heat to falling droplets of water and alcohol that have condensed to promote vaporization of the alcohol in such droplets, and the transfer of heat from water vapor to promote the condensation of such water vapor. The spreader and concentrator plates are separated by spacers and held together in an assembly to form a portion of the internal structure of the reflux column. In addition, the lines for the incoming beer supplied to the reflux column are connected in a heat transfer relationship with some of the spreader and concentrator plates so that the incoming beer provides the reflux for the column.

Also, heat exchangers are used in various portions of the apparatus to capture heat which would otherwise be lost and to utilize the same to increase the efficiency of the apparatus and method.

The method of the present invention for producing alcohol fuel from feed stock utilizes the introduction of and mixing of water and enzyme with feed stock, then heating that feed stock, water and enzyme mixture until the feed stock is cooked. Alcohol producing organisms are added to and mixed with the cooked feed stock, fermenting the cooked feed stock into mash and beer. The beer is separated from mash, and the beer is admitted in a controlled quantity into the reflux column so as to maintain a specific sensible heat in the reflux column at a point where the alcohol vapors are to be withdrawn from the reflux column. The beer admitted to the reflux column is utilized also for reflux. The beer is distilled, and the uncondensed alcohol vapors are drawn off from the reflux column at or near said point. The alcohol vapors from the reflux column are condensed with water, and then the heated water from the condensor is introduced back into the feed stock. A denaturing agent is added to the alcohol to form unpottable alcohol fuel. Hot residue liquid accumulates from the distillation process at the bottom of the reflux column and is utilized to provide at least a portion of the heat used to cook the feed stock, heat the beer prior to its entering into the reflux column, and alternatively returned to the cooked feed stock or discharged as required to maintain the desired quantity of liquid under process.

One object of the apparatus and method of the present invention is to provide an efficient economical way to produce alcohol fuel.

Another object of the present invention is to provide a distillation apparatus and method which utilizes what would be otherwise lost heat and usefully returns the same to the distillation apparatus and method.

Yet another object of the present invention is to provide a continuously operated alcohol fuel producing apparatus and method.

Still another object of the present invention is to provide a reflux column which has a single sensible heat control for both the quantity of beer being admitted to a reflux column and the amount of reflux.

A further object of the present invention is to provide an apparatus and method which maintains heat transfer surfaces therein at a high efficiencies.

Still a further object of the present invention is to control the flow of beer at less then full flow in such a manner to avoid disruptions.

A still further object of the present invention is to use the heat in the residue liquid from the reflux column to cook the feed stock, to heat incoming fluids, and also to increase the temperature of the beer entering the reflux column.

These and other objects of the present invention will become apparent from the accompanying drawings and the following written descriptions.

DESCRIPTION OF THE PREFERRED EMBODIMENT

Figure 1:
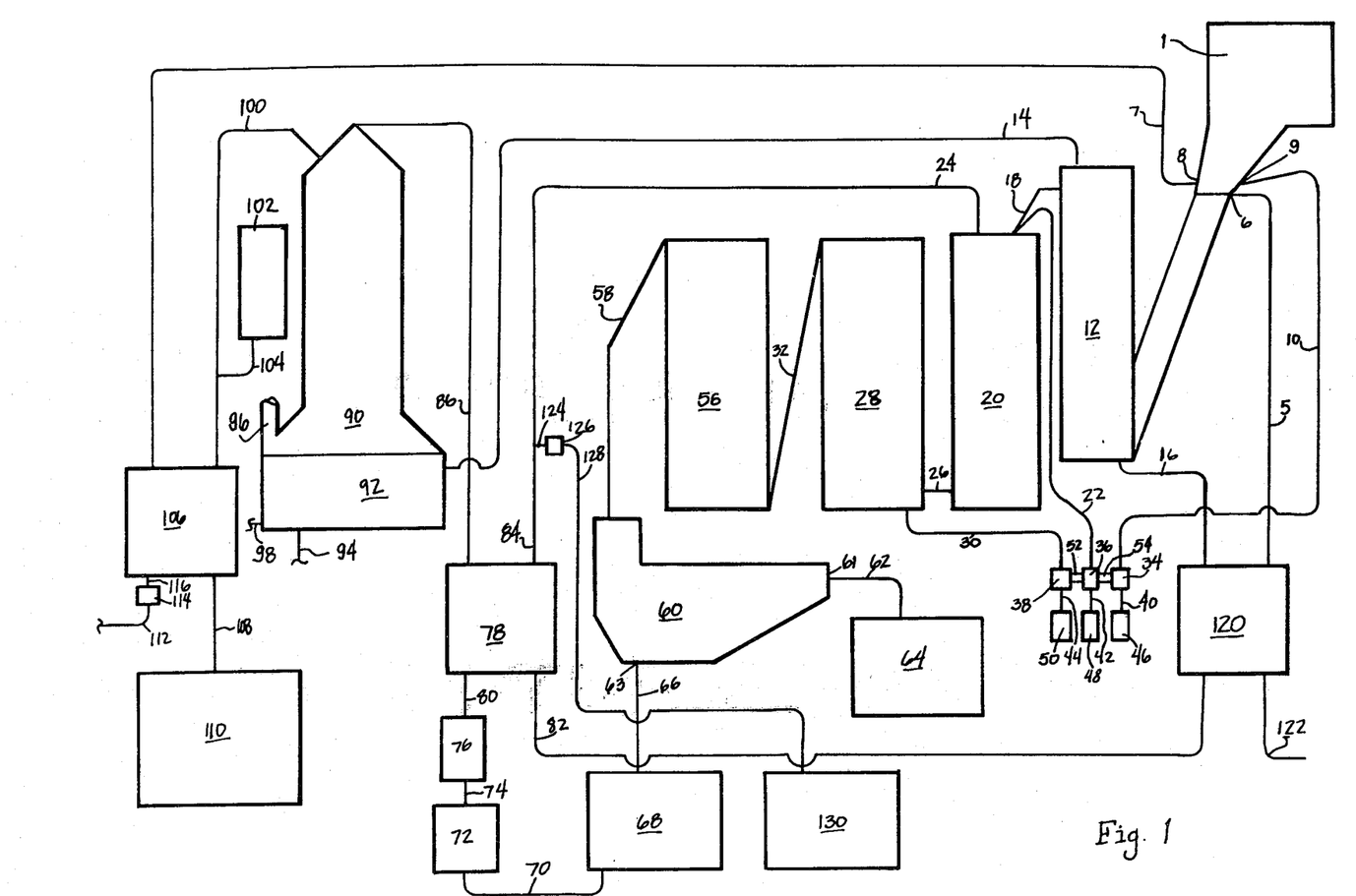
FIG. 1 is a schematic diagram of the apparatus and method of the present invention for producing alcohol fuel from feed stock.

Referring to FIG. 1, the apparatus of the present invention comprises a storage hopper 1 which may be filled with feed stock, such as corn, for converting the same into alcohol fuel. The hopper 1 is emptied by an auger 3. At the juncture between the auger 3 and hopper 1, provision is made for adding hot water from a line 5, the line 5 having an outlet 6 at the juncture between the auger and the hopper. Additional water may be added from a line 7 which has an outlet 8 at the juncture between the hopper and auger. In addition to water being added to the feed stock, a first enzyme may be added through an outlet 9 from a line 10, the first enzyme generally assisting in preventing the feed stock from clogging in the auger and initiating the break down of the feed stock starch.

The auger 3 discharges the feed stock at its bottom to the lower portion of a cooker tank or vessel 12. The cooker vessel 12 will be more fully described in conjunction with FIG. 2. The cooker vessel 12 is heated by hot residue liquid which flows into the cooker vessel 12 from a line 14 and is discharged from the vessel 12 by a line 16. The cooked mixture leaves the cooker vessel 12 by means of a duct 18 at the top of the cooker vessel 12.

Figure 2:
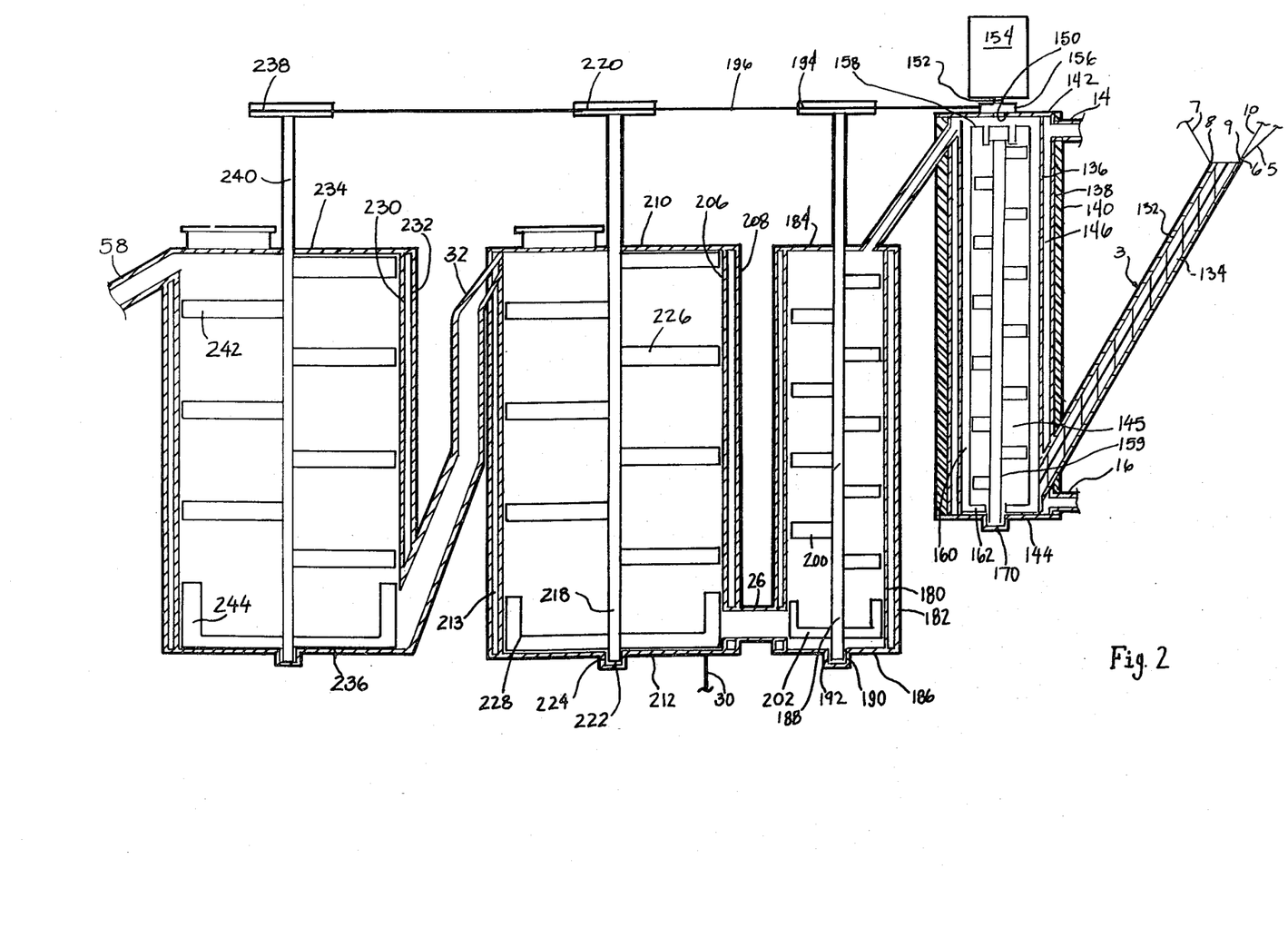
FIG. 2 is a vertical cross-sectional view of an auger, cooker vessel, enzyme and fermentation tanks of the apparatus of the present invention depicted in FIG. 1.

An enzyme tank or vessel 20, which will also be more fully described in conjunction with FIG. 2, receives the cooked mixture from the lower end of duct 18. In addition, the enzyme vessel 20 is supplied with a second enzyme which enters from line 22. This second enzyme assists in the starch to sugar conversion of the feed stock. Further, makeup residue liquid, from a source hereinafter described, may be added to the top of the cooker vessel 20 through the line 24.

The now fermenting mixture from the lower end of the enzyme vessel 20 is discharged to a duct 26, which in turn is connected to the lower end of a first fermenting tank or vessel 28. The fermenting vessel 28 will be more fully described in conjunction with FIG. 2. The first fermenting vessel 28 may be supplied at its lower end with a third enzyme through the line 30. The third enzyme is an alcohol producing organism which convert sugar to alcohol. The fermenting mixture from vessel 28 is discharged from its upper end to a downwardly extending duct 32.

As is shown enzyme lines 10, 22, and 30 are connected to a plurality of separate pumps 34, 36 and 38 which, in turn, are connected by feedlines 40, 42 and 44 to three enzyme containers 46, 48 and 50. Three separate enzyme systems and enzyme containers are provided as the enzymes introduced at various parts of the system are different. Each different enzyme is used to accomplish different purposes. The first enzyme (such as Alpha Amylase) in line 10 initiates starch breakdown and prevents clogging of the feed stock mixture, and the second enzyme (such as Gluco-Amylase) and third enzymes (conventional alcohol producing organisms) from lines 22 and 30 promote the starch to sugar and sugar to alcohol conversions, respectively. As represented by the connectors 52 and 54, the pumps 34, 36 and 38 may be connected together so that they deliver proportionate amounts of the respective enzymes as desired. Each of the pumps 34, 36 and 38 is set up to deliver the desired quantity and all three may be driven by a common motor or separate motors as desired.

A second fermenting tank or vessel 56 receives the partially fermented mixture discharged from the lower end of duct 32. The second fermenting vessel 56 will be more fully described in conjunction with FIG. 2. Vessel 56 in turn discharges the fully fermented mixture from its upper end to a duct 58.

A separator or strainer 60 connected to the lower end of duct 58 receives the fermented mash and beer. In the strainer 60, the solids portions of mash is separated and discharged through an outlet 61, to the right as shown in FIG. 1, to a line 62. The line 62 in turn empties into a storage tank 64. The mash may be removed from storage tank 64 periodically and put to various conventional uses. In the strainer 60, the liquid beer which has been separated from the solids of the mash, is discharged from an outlet 63 at the bottom of the strainer 60 to a line 66. The line 66 in turn discharges the beer into a beer level control tank 68, which level can be sensed by various means such as a float valve. The beer is discharged from the level control tank 66 through a line 70 to the intake side of a pump 72. The pump 72 pumps the beer upward through a line 74 which in turn is connected to a control valve 76, which will be more fully described in conjunction with FIG. 4.

When the control valve 76 is open the beer may flow under the influence of the pump 72 through a heat exchanger 78 which is connected to the valve by the line 80. The heat exchanger 78 is supplied with hot residue liquid from a line 82 which in turn after passing through the heat exchanger 78 and giving up some of its heat to the beer, is discharged to a line 84. After the beer is heated by passing through the heat exchanger 78, it is discharged to a line 86 which connects to the top of a distillation or reflux column 90, the column being more fully described in conjunction with FIGS. 5 through 9.

The distillation or reflux column 90 includes a heat generator in the form of a boiler 92 at its lower end. The boiler 92 may be supplied with a fuel, such as gas or alcohol, through a line 94, and the hot burnt gases are discharged from the boiler 92 through a stack 96. A boiler drain line 98 is provided at the lower end of the boiler to drain the same as desired. Accumulated hot residue, actually low or no alcohol content liquid or water, can be taken off through the line 14, heretofore described. Thus, the hot residue liquid from boiler 92 traveling through line 14 to the cooker 12, may be used to heat the cooker.

In the reflux column 90, the alcohol vapors are collected and can be taken off through a line 100. A denaturing agent from denaturing means 102 may be discharged into the uncondensed alcohol vapors through line 104 which connects with line 100. As the denaturing agent is delivered directly to the yet uncondensed alcohol vapors, in the apparatus and method of the present invention pottable alcohol may never be formed so that only regulations pertaining to distillation need be complied with, and the regulations pertaining to pottable alcohol storage are not applicable.

The uncondensed alcohol vapors with the denaturing agent added are delivered to a condenser 106 which condenses the alcohol vapors into denatured liquid alcohol. The liquid alcohol is then drawn off the condenser through a line 108 and delivered to a storage tank 110 for further use.

In order to cool the condenser 106, service water is supplied from a line 112 through a thermostatic valve 114 which in turn is connected to the heat exchanger 106 by a line 116. The thermostatic valve 114 regulates the flow of the water to the heat exchanger 106 to maintain the condensing action. After being used to condense the alcohol vapors, the water delivered to the heat exchanger 106 is discharged to the line 7 heretofore mentioned and added to the feed stock at inlet 8 at the juncture between the hopper 1 and auger 3.

After the hot residue from the boiler 92 is used to cook the feed stock in cooker 12, it too is delivered through the line 16 heretofore mentioned to another heat exchanger 120. Here again a portion of the remaining heat in the hot residue is transferred to the incoming service water supplied to the heat exchanger 120 through the line 122. The heated water from the heat exchanger 120 is discharged through the line 5, heretofore mentioned.

After leaving the heat exchanger 120, the hot residue is discharged to the line 82 heretofore mentioned, and passes through the heat exchanger 78 heretofore mentioned. Depending upon the liquid level in the beer tank 68, the residue in line 84 may pass either to a line 124 if a residue control valve 126 is open, or to the line 24 heretofore mentioned if the residue control valve 126 is closed. The residue control valve 126 is connected to a line 128 which in turn discharges to a tank 130. The operation of valve 126 is controlled by the liquid level in beer tank 68. Should the liquid level in the beer tank 68 be low, the residue control valve 126 is closed, and the residue leaving the heat exchanger 78 through line 84 is transfered to the line 24 back to the enzyme tank 20 to maintain or increase the liquid level in the system. Should the liquid level in the beer tank 68 be high, the residue control valve 126 will be opened, and the beer from the heat exchanger 78 flows through line 84, line 124, residue control valve 126 and line 128 to the tank 130, from which it may be disposed of as desired.

Now that the overall operation of the apparatus and method of the present invention has been described, the individual components thereof will be more fully described. Referring now to FIG. 2, the auger 3 comprises a tubular housing 132 containing an auger screw 134 extending the full length of the housing. The lines 5 and 7 supplying water and the line 10 supplying the first enzyme empty into the top of the auger. The feed stock from the hopper 1 is drawn by the screw 134 through the auger housing and thoroughly mixed with the water and enzyme.

As is shown, the cooker 12 comprises a vessel of double-wall construction having a cylindrical inner wall 136 surrounded by an outer cylindrical wall 138, which in turn to reduce heat loss, is surrounded by a layer of insulation 140. The top of the vessel 12 is closed by an annular plate 142 secured to the upper ends of the inner wall 136 and outer wall 138. The lower end of the vessel 12 is closed by a circular plate 144 secured to the lower ends of the inner wall 136 and the outer wall 138. If desired, the upper and lower plates could be of double wall construction and covered with insulation. As is shown the lower end of the auger housing 132 extends through openings in the outer wall 138 and inner wall 136 so that the auger discharges to the space 145 defined by the inner surface of inner wall 136 and the inner surface of upper plate 142 and lower plate 144. The openings in the inner wall 136 and outer wall 138 for the auger housing 132 are sealed to be liquid tight. Lines 14 and 16 (shown at the side in FIG. 2, instead of the top and bottom as in FIG. 1) extend through and are sealed to the outer wall 138 at the upper and lower ends of the vessel 12, respectively. Thus, the space 146 between the outer surface of the inner wall 136 and inner surface of the outer wall 138 with the upper and lower plates 142 and 144 form a water jacket 146 for the cooker 12. The hot residue from the boiler 92 is supplied to the water jacket 146 from the line 14 and discharged therefrom through the line 16. If desired, a separate steam jacket (not shown) may be provided on the cooker above the water jacket to provide additional heat.

The upper plate 142 of vessel 12 has an opening at its center 150 through which a slowly rotating shaft 152 extends. The shaft 152 at its upper end is connected to a gear reduction motor 154. Intermediate the motor 154 and the upper plate 142 a drive sprocket 156 is mounted to shaft 152. After extending through the opening 150, the shaft 152 is fitted with radially extending arms 158. The arms 158, in turn carry downwardly extending triangularly shaped wooden scrapers 160. The lower ends of the scrapers 160 are similarly mounted to lower arms 162 which bear against a stationary shaft 159 to hold the lower end of the scrapers 160 against the inner surface of the wall 136. The scrapers 160 are pivotally mounted to the arms 158 and 162 so that the scrapers may pivot as they engage with the inner surface of the inner wall 136 to keep the same free from caking, cooked feed stock. The scraping action greatly enhances the heat transfer from the water jacket 146 through the inner wall 136 to the feed stock as it prevents a build up which would decrease heat transfer to the feed stock. Thus, as the gear motor 154 rotates, it in turn drives the shaft 152, the arms 158, arms 162 and scrapers 160 circularly about the periphery of the cooking vessel.

To assist the cooked mixture in the vessel 12 in moving from the lower end to the upper end thereof, a plurality of stationary pitched guide vanes 166 are provided. The guide vanes 166 are mounted to the stationary shaft 159. To prevent the shaft 159 from turning, its lower end is square and is receivable in a similar square opening formed in the center hub portion 170 of the lower plate 144. To accommodate the rotation of the scrapers 160, a bearing 172 is provided between the upper end of the shaft 159 and the lower underside of the arms 158, those arms having an extended hub portion 174 to accomodate the bearing 172. Thus, while the scrapers 160 rotate, the plurality of pitched, guide vanes 166 do not. However, as the scrapers 160 rotate, they tend to impart a rotating motion to the mixture in the cooker 12. The rotating mixture as it passes over the guide vanes 166, which are pitched in an upward direction in the direction of rotation, causes the mixture as it passes over the guide vanes to tend to move upward in the cooker. The cooker vessel 12 is constructed not only to enhance heat transfer, but also to insures good mixing of the water and enzyme mixture which occurs as the mixture rotates over the guide vanes 166.

As shown, the upper end of duct 18 is sealingly connected to an opening in the outer wall 138 and second opening in the inner wall 136 to maintain the water jacket 146 liquid tight. The cooked mixture from the cooker vessel 12 is discharged into the upper end of the duct 18, and the lower end of the duct 18 discharges the mixture to the enzyme vessel 20.

The enzyme vessel 20 is also of double-wall construction, having a cylindrical inner wall 180 and a cylindrical outer wall 182. The upper end of the enzyme vessel 20 is closed by an annular plate 184, and the lower end is closed by a circular plate 186. An annular space formed between the inner wall 180, outer wall 182 and upper and lower plates 184 and 186 define a jacket which may be supplied with hot or cool fluid, such as air, or sealed to control the temperature in the enzyme vessel. If desired, a helical coil (not shown) may be located within the enzyme vessel for circulation of hot or cold fluids to help control the temperature therein.

The upper plate 184 has a center opening accomodating a shaft 188 which extends through to near the bottom of the enzyme vessel 20. The lower end of shaft 188 is fitted with a bearing 190. The bearing in turn engages in a hub portion 192 of the lower plate 186. The upper end of shaft 188 carries a large driven sprocket 194 which in turn is driven by belt or chain 196 connecting to the smaller drive sprocket 156 so that the shaft 188 rotates slower than the shaft 152. To promote mixing of the cooked feedstock introduced from the duct 18 and the second enzyme introduced through the line 22 discharging to the top of the fermenting vessel, the shaft 188 carries a series of pitched blades or paddles 200. The blades 200 are also pitched to cause the mixture in the vessel 20 to tend to move downward as the shaft 188 rotates. At the bottom of the shaft 188 are a plurality of plow-like blades 202 which as they rotate tend to cause the mixture to move radially outwardly to assist the mixture in moving from the enzyme vessel 20 through the duct 26.

The first fermenting tank or vessel 28 is, likewise, of double wall construction, having a cylindrical inner wall 206 and a cylindrical outer wall 208 joined to an upper annular plate 210 and lower circular plate 212 at the upper and lower ends, respectively. The duct 26 extends through the outer wall 208 and the inner wall 206 to communicate with the space defined by the inner surface of the inner wall 206 and the upper and lower plates 210 and 212. Again, the inner wall 206 and outer wall 208 are sealingly connected to the outer circumference of the duct 26. The inner wall 206, outer wall 208, upper plate 210 and lower plate 212 form an air jacket 213 for the first fermenting vessel 28 for controlling the temperature therein. Like the air jacket on the enzyme vessel, air may be admitted to the air jacket 213 or it may be sealed to help control temperature.

To promote mixing within the fermenting vessel 28, a shaft 218 extends through an opening in the center of upper plate 210 to the bottom of the fermenting vessel 28. At its upper end, the shaft 218 carries a driven sprocket 220 which is drive by the chain or belt 196 and is rotatably mounted in a bearing (not shown) carried on upper plate 210. The lower end of the shaft 218 is rotatably mounted in a bearing 222 fitting within a center hub portion 224 of the lower plate 212. A plurality of blades or paddles 226 which are similar to blades 200, but different in that they are longer and pitched to cause the mixture to move upwardly instead of downwardly, are secured to the shaft 218. At the bottom of the shaft 218 a pair of plow-like blades 228, are secured to the shaft 218. The plow-like blades 228 are similar to the plow-like blades 202, but different in that they cause the mixture to tend to move radially inwardly, instead of outwardly. Thus, as the chain 196 causes the sprocket 220 to rotate and, in turn, the shaft 218 to rotate, the plow-like blades 228 tend to cause the mixture from the enzyme vessel 20 to be drawn in from duct 26. Likewise, as the paddles 226 rotate, they cause the mixtures to mix with the second enzyme introduced through the line 30 at the bottom of vessel 28 and to move upwardly toward the discharge duct 32 at the upper end of the fermentation vessel 28. The upper end of the duct 32 extends through openings in the outer wall 208 and the inner wall 206 and is sealed thereto to make the air jacket 213 fluid tight, and communicates with the interior space defined by the inner surface of the inner wall 206. The lower end of the duct 32 discharges to a second fermentation tank 56.

The second fermentation tank or vessel 56 is provided to allow sufficient time for fermentation to be completed and is used rather than using a single larger vessel. The second fermenting vessel 56 is similar to the first fermenting vessel 28 and comprises an inner cylindrical wall 230 and an outer cylindrical wall 232 which are joined to an upper annular plate 234 and a lower circular plate 236. The second vessel 56, likewise, has a sprocket gear 238 which drives a shaft 240 rotatably mounted in the vessel 56, a set of upwardly pitched paddles 242 and lower plow blades 244, the latter two being similar to the paddles 220 and blades 228 of the first fermentation vessel 28 previously described. As shown, the second fermentation vessel 56 discharges through the duct 58.

As an alternative to the fermentation vessel arrangement shown in FIGS. 1 and 2, two fermentation tanks could be arranged in parallel, instead of in series, so that they could be used for batch processing. When in a parallel arrangement, one of the fermentation tanks would be fermenting grain while the other was being cleaned with steam to control bacteria growth. In such an alternative arrangement, the duct 26 would be modified to feed both tanks; the duct 58 would be modified to receive the discharge from both tanks; and duct 32 would be eliminated. Of course, the necessary valves to control the flow of the mixture from the enzyme tank 20 to either one of the two fermentation tanks which would be fermenting grain and from that tank would have to be provided. Likewise, valves would have to be provided to so that the steam was only ducted and exhausted from the other of the two tanks.

The gear motor 154 and sprocket 156, 194, 220 and 238 are selected so that the shaft 152 in the cooker vessel will rotate at 15-30 rpm, the shaft 188 in the enzyme vessel at 10-25 rpm and the shafts 218 and 240 in the fermenting vessels at 4-7 rpm.

Figure 3:
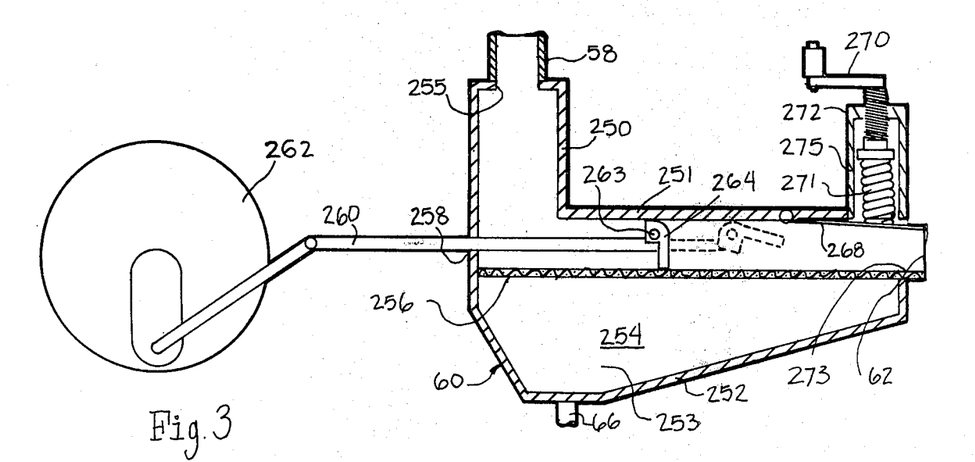
FIG. 3 is a vertical cross-sectional view of means for separating the alcohol beer from mash of the apparatus of the present invention depicted in FIG. 1.
Figure 4:
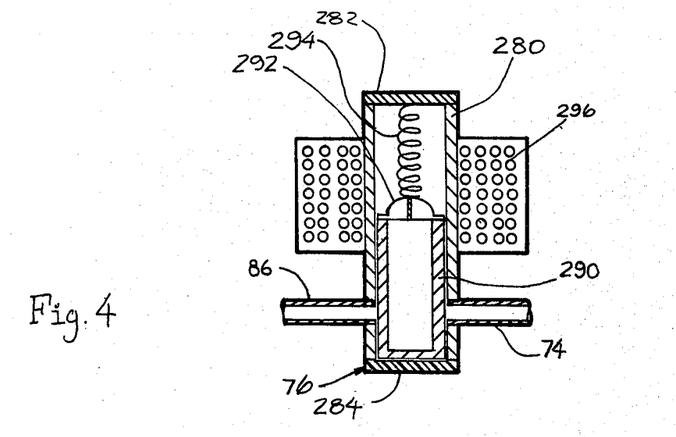
FIG. 4 is a cross-sectional view of a control valve of the apparatus of the present invention depicted in FIG. 1.

Referring now to FIG. 3, the separating means or strainer 60 for separating the solids in the cooked mash from the liquid beer is illustrated, and comprises a generally "L" shaped housing having an upper "L" shaped wall 251, and a lower "L" shaped wall 252 forming a trough 253, closed by "L" shaped side walls 254. The housing 250 has an inlet 255 connected to the lower end of the duct 58. Intermediate the upper wall 251 and the lower wall 252, a horizontal screen member 256 is provided. The fineness of screen 256 is chosen so that the solids of the mash will not pass through the screen, but the liquid beer will. Generally screen of approximately 40 mesh is satisfactory. A rod opening 258 is provided in a vertical portion of the wall 252 at a level intermediate the lower portion of wall 251 and the screen 256. In rod opening 258, an elongated reciprocal rod 260 is slidably mounted. As shown in FIG. 3, the rod 260 has its left end reciprocated by means of the crank and rod assembly 262. The right hand end of the rod carries a cross rod 263 which slides on guides (not shown) provided on side walls 254 and is mounted to right hand end of the rod 260. The cross rod 263 in turn carries a ram 264 which is pivotably mounted to the cross rod 263. The ram 264 has a first generally vertical position, perpendicular to the screen 256 and closing off the space between the horizontal, lower portion of wall 251 and the screen. The ram is constructed to assume a first position when the rod 260 moves the ram 264 away from the inlet 255 and toward the right as shown in FIG. 3. When the rod 260 moves the ram 264 toward the inlet 255 and the left as shown in FIG. 4, the ram 264 pivots to a more horizontal position (shown in dashed lines) parallel to the screen 256 so that it no longer closes off the space between the horizontal portion of wall 251 and the screen 256. At the right end of wall 251 is provided a pivotable flap 268 which may be biased toward the screen 256 to close off the space between wall 251 and screen 256. To adjust the bias of the flap 268, a threaded crank arm 270 is provided and engages in a threaded opening 272 provided in a raised extension 275 on the right side of the wall 251. The end of the crank arm 270 below the threaded portion is connected to a spring 271 which in turn is connected to the flap 268. Thus, as the crank handle 270 is screwed downwardly, the spring causes the flap 268 to close off the space between the flap and screen 256 (to decrease the effective cross section of the outlet) and increase the resistance which the ram 264 meets as it pushes the mash in front of it toward the outlet opening 273 between the end of the flap 268 and screen 256 and into the duct 62. As the ram 264 moves toward the right it compresses the mash in front of it, causing the liquid to pass through the screen 256 and collect in the trough 253, the solids being driven out through outlet 273 into the duct 62. On its return stroke to the left, the ram 264 pivots upwardly to a more horizontal position permitting the ram to more easily pass through mash until it reaches its left hand limit of travel which is just somewhat short of the left hand edge of the screen 256 or left side of the wall 252. When in this position, a new load of fermented mash can then fill the space in front of the ram 264 for the next stroke to the right. In operation, the left and right strokes of the ram are repeated at a rate to accomodate the amount of grain being fermented. While the solids of the mash are driven off to the right, the beer passes through the screen 256, is colleted in the trough 253 and is discharged through the duct 66. When the mash is wet, the separater or strainer 60 uses the beer passing through the screen to flush it clean. When the mash is dry, the ram passing in close proximity, but not riding on the screen, on the stroke to the right, also tends to keep the screen clear by scrapping action.

The beer is discharged through the line 66 to the level control tank 168, passes through the line 70 and is delivered to the pump 72. From the pump 72, the beer is delivered to the control valve 76, which is more fully shown in FIG. 4.

Referring to FIG. 4, the control valve 76 comprises a cylindrical housing 280 made at least partially of nonmagnetic material. The ends of the housing 280 are closed by circular plates 282 and 284. The line 74 extends through an opening in the housing 280 and seals with the same. The line 86 likewise extends from the opposite end through an opening in the housing 280 to seal with the same. A slidable valve body 290 is provided within the interior of the housing 280. The valve body 290 is preferably hollow, and each end of the valve body 290 has approximately the same area so as to minimize differential forces working on opposite ends of the valve body 290. The cylindrical valve body 290 is open at both ends, and at the end adjacent the circular plate 282 arms or a spider 292 bridge across opposite sides of the body 290. A first biasing means in the form of a spring 294 is provided and abuts at one end the plate 282 and at the other end the spider 292. A second biasing means in the form of a electric solenoid coil 296 is mounted to and surrounds the body 280. The coil 296 cooperates with the valve body 290 which is of magnetic material, to cause the valve body 290 to compress the spring 294 when the coil 296 is energized or magnetized and draw the valve body 290 away from the lines 74 and 86 so that they may communicate with one another to permit the beer to pass through the valve 76. When the coil 296 is deenergized, the spring 294 forces the valve body 292 between the line 74 and 76 to cut off fluid communication between those lines.

The flow of beer through the valve 76 is controlled by an electronic circuit which may vary the period of time for a given cycle that the valve body 290 would remain in an open position. A three second cycle has been found to be satisfactory as it permits equilibrium conditions in the column to be maintained. For full flow the valve body 290 would remain in its open position for the entire cycle. For no flow the coil 296 would not be energized and the valve body 290 would remain in a position substantially as shown in FIG. 4. For intermediate flows between full and an no flow, for a given cycle the period of time the valve body remains in the open position varies over the cycle. The advantage of this valve construction is that the valve will not clog even at partial or very low flows, as at even very low flows the valve is either fully opened or closed and only momentarily partially open, while in transition from its opened or closed state. Of course, the same electronic circuit could be made to control the operation of the pump 72 to that it is on only when the valve 76 is open.

Figure 5:
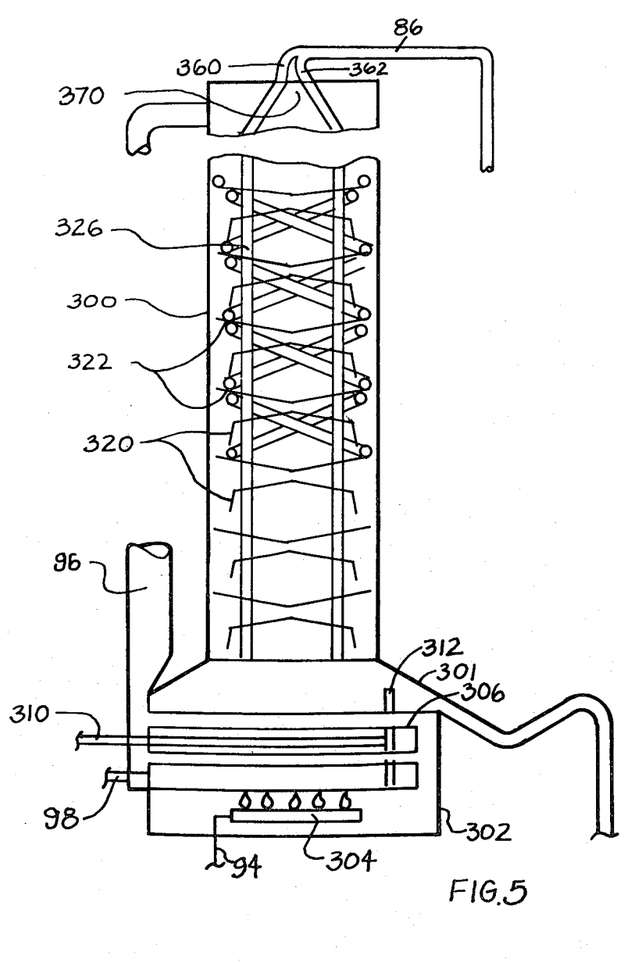
FIG. 5 is a cross-sectional view of a distillation or reflux column of the apparatus of the present invention depicted in FIG. 1.

Referring to FIG. 5, the distillation or reflux column 90 and the boiler 92 comprise an elongated cylindrical housing 300 which sits atop a truncated conical wall 301. The boiler 92 has a wider, cylindrical housing portion 302 connected to the wall 301, which contains a heat source, such as a gas or alcohol burner 304 and boiler tubes 306. The boiler itself is filled with beer on startup, and thereafter by residue liquid from the distillation process, which is mainly water. The heat side of the boiler tubes are exposed to hot gases from the burner 304. After passing through the boiler, the hot gases are exhausted through the stack 96. The liquid side of the boiler tubes are fitted with scraper means in the form of a rod 310 which carries a scraper 312 fitting around the boiler tubes to scrap off any buildup which might occur on the liquid side of the boiler tubes. The rod 310 passes through a seal (not shown) in housing 302. The provision of such scraper greatly enhances the efficiency and heat transfer of the boiler and keeps the boiler operating at high efficiency for a long period just by periodically reciprocating the scraper 312 over the boiler tubes. Instead of a boiler, steam could be introduced into the reflux column for boiling off the alcohol.

As shown in FIG. 5, an assembly of spreader plates 320 (shown in detail in FIGS. 6 and 7) and concentrator plates 322 (shown in detail in FIGS. 8 and 9) are assembled within the reflex column 90. The spreader plates 320 and concentrator plates 322 are alternatively stacked or interleaven and are held apart from one another by short cylindrical spacers 326. The spreader plates 320, concentrator plates 322 and spacers 326 are held assembled by fasteners (not shown).

Figure 6:
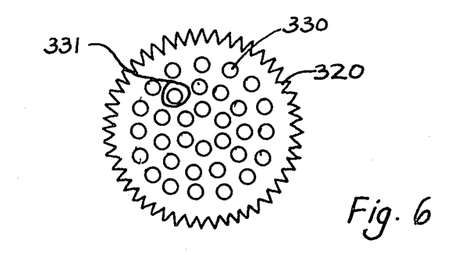
FIGS. 6 and 7 illustrate the spreader plate, in plan and elevational views, used in the reflux column shown in FIG. 5.
Figure 7:
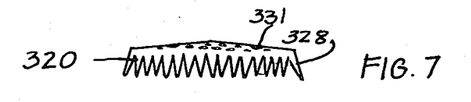

As is more fully shown in FIGS. 6 and 7, each spreader plate 320 comprises generally a circular disk which is dished slightly concave downwardly. Extending downwardly from the perimeter of the disk 320 are a plurality of spreader fingers or teeth 328. The function of the spreader fingers 328 is to form a plurality of drops, one at each of the fingers, and to cause the drops to drop down uniformly along the perimeter of the entire spreader plate 320. To facilitate passage of the alcohol vapors from the lower end to the upper end of the reflux column, the plates 320 are provided with a plurality of small openings 330 of about 3/16 of an inch in diameter. Also, larger openings 331 are provided through the spreader plates 320 for the fasteners to hold the spreader plates, spacers and concentrator plates in an assembly.

Figure 8:
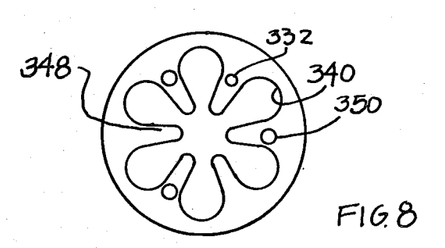
FIGS. 8 and 9 illustrate the concentrator plate, in plan and elevational views, used in the reflux column shown in FIG. 5.
Figure 9:
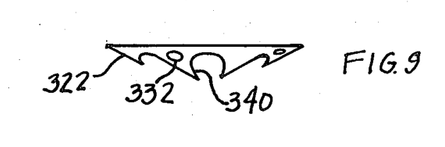

Referring now to FIGS. 8 and 9, each concentrator plate 322 is generally a circular disk which is dished concave upwardly so as to funnel collected droplets toward the interior of the plate. The concentrator plate has at its center an opening 340 which has a plurality of radially, outwardly extending leaves or bays. As these leaves of the opening 340 move radially outwardly they at first become wider, but then terminate in generally semicircular margins. Thus, between each bay of the opening 340 is defined a inwardly, radially extending arm or finger 348 which is pitched downwardly. The function of these inwardly extending arms 348 is to concentrate the condensing liquids towards the interior margin of the concentrator plate 322. Also, the openings 340 assist or permit the vapors in the reflux column to pass upwardly. The concentrator plates 322 also are provided with openings 350 for the fasteners which hold together the spreader plates, concentrator plates and spacers.

As shown in FIG. 5, alternately spreader plates 320 and concentrator plates 340 are interleaven together and spaced apart by spacers 326. The spreader plates 320, concentrator plates 322 and spacers 326 are stacked together and fasteners (not shown) are passed through the openings in the spreader plates 320, concentrator plates 322 and spacers 326 to form the assembly for the reflux column. Generally the number of spreader plates 320 and the number of concentrator plates 322 in the column and the spacing between sets of plates 320 or 322 will vary with the capacity of and the design criteria for the column. A near atmospheric column producing approximately 2.5 gallons per hour of 190 proof alcohol from a 10% beer solution would have approximately forty sets of concentrator and spreader plates, with each set being spaced about $2\frac{1}{2}$ to 3 inches apart at the bottom and about $1\frac{1}{2}$ to 2 inches at the top.

The beer is brought into the reflux column 90 at a temperature of 150° F. or less, by the line 86 which connects to two lines 360 and 362. The lines 360 and 362 enter the reflux column and in turn helically wind their way down the concentrator plate and spreader plate assembly to about the midpoint in the column, and then discharged onto a spreader plate. To insure good heat transfer between the lines 360 and 362 to the adjacent spreader plates 320 and concentrator plates 322 which the lines pass, such are connected in a heat transfer relationship, such as by soldering. For good heat transfer, the spreader plates 320, concentrator plates 322 and lines 360 and 362 are preferably made of copper. In this manner, the heated beer from the heat exchanger 78 flowing through lines 360 and 362 may be used to provide reflux to the plates 320 and 322 to which the lines are soldered to. In order to control the amount of reflux provided to the column, a sensible heat sensor 370 is provided at the upper end of the column at or near the point were the alcohol vapors are drawn off. This heat sensor 370 controls the operation of the control valve 76. When the sensible heat sensed by sensor 370 is low, the sensor causes the valve 76 to close for a greater part of the cycle. When the sensible heat sensed by the sensor 370 is high, this sensor causes valve 76 to open for a greater part of the cycle thereby adding additional beer and reflux. By use of just the single control, the quantity of the beer entering the column 90 and the reflux provided to the column are both controlled. The unique design of the spreader and concentrator plates give the reflux column 90 high efficiencies when operated at both full capacity and at less than full capacity. The provision of a single control for the beer into the column and for the reflux of the column simplifies the control of the distillation process and contributes to the high efficiencies as there is no need to balance several controls.

By utilizing the apparatus and methods of the present invention, it is possible to produce alcohol fuel from feed stock, such as corn, while consuming only a small percentage of the heat valve of the fuel produced, thereby eliminating one of the principal disadvantages of the prior distillation devices and techniques used to produce alcohol.

While only the preferred embodiment of the apparatus of the present invention and the preferred method of the present invention have been illustrated and described, it should be apparent from the foregoing that variations and modifications in the structure and steps of the present invention can be made and that such will still fall within the scope of the appended claims.

What is claimed is:

1. A reflux column for use with continuous operating apparatus for producing alcohol fuel from feed stock, comprising a column housing adapted to be positioned above and in liquid and vapor communication with a heat generator, a plurality of interleaven spreader plates and concentrator plates located in said column housing, said adjacent spreader and concentrator plates being spaced apart, a plurality of spacers separating said spreader and concentrator plates, each of said spreader plates being dish shaped and oriented to have its convex side facing upwardly for causing flow of liquid to its periphery, having a downwardly extending sawtooth portion about its periphery for inducing the formation of droplets, and inwardly of its periphery having a plurality of openings for passage of vapors therethrough, each of said concentrator plates being dish shaped and oriented to have its convex side facing downwardly for causing flow of liquid to its interior, and having a radial-like opening at its center with plurality of leaves extending outwardly toward its periphery for permitting passage of vapors while concentrating liquids toward the center, whereby the rising vapors and the descending liquids are effectively and efficiently brought in contact with each other allowing latent heat transfer between the vapors and liquids for various operating capacities of the column.

2. A reflux column for use with continuous operating apparatus for producing alcohol fuel from feed stock as in claim 1, wherein said reflux column has a beer inlet tube for conveying beer into said reflux column, said beer inlet tube being attached in a conductive, heat transferring relationship to at least some of said concentrator and spreader plates, whereby the sensible heat of said beer may be utilized as reflux.

3. A reflux column as in claim 2, wherein said beer inlet tubes discharge the beer to said plates about midway in said column, whereby the latent heat of the alcohol in said beer is used as reflux.

* * * * *